US012719600B2

(12) United States Patent
Peyla et al.

(10) Patent No.: US 12,719,600 B2
(45) Date of Patent: Aug. 25, 2026

(54) QUANTIZED TRANSPORT FOR IMPORTER-EXPORTER AUDIO CLIENT IN DIGITAL RADIO BROADCAST

(71) Applicant: iBiquity Digital Corporation, Calabasas, CA (US)

(72) Inventors: Janet Peyla, Calabasas, CA (US); Russell Iannuzzelli, Calabasas, CA (US)

(73) Assignee: iBiquity Digital Corporation, Columbia, MD (US)

( * ) Notice: Subject to any disclaimer, the term of this patent is extended or adjusted under 35 U.S.C. 154(b) by 291 days.

(21) Appl. No.: 18/705,148

(22) PCT Filed: Oct. 25, 2022

(86) PCT No.: PCT/US2022/047725
§ 371 (c)(1),
(2) Date: Apr. 26, 2024

(87) PCT Pub. No.: WO2023/076266
PCT Pub. Date: May 4, 2023

(65) Prior Publication Data

US 2025/0047400 A1 Feb. 6, 2025

Related U.S. Application Data

(60) Provisional application No. 63/273,779, filed on Oct. 29, 2021.

(51) Int. Cl.
*H04H 20/00* (2009.01)
*H04B 1/00* (2006.01)
(Continued)

(52) U.S. Cl.
CPC .......... *H04H 20/423* (2013.01); *H04H 60/07* (2013.01); *H04H 2201/18* (2013.01)

(58) Field of Classification Search
None
See application file for complete search history.

(56) References Cited

U.S. PATENT DOCUMENTS 7,899,451 B2 * 3/2011 Hu ........................ H04W 48/17 370/332
8,660,479 B2 * 2/2014 Johnson ................. H04H 40/18 455/550.1
(Continued)

FOREIGN PATENT DOCUMENTS

WO WO2011044349 A1 * 4/2011 ............. H04H 20/18

OTHER PUBLICATIONS

International Search Report for Application No. PCT/US2022/047725 mailed Feb. 10, 2023. 3 pgs.

*Primary Examiner* — Sai Aung
(74) *Attorney, Agent, or Firm* — Lerner David LLP

(57) ABSTRACT

A method comprising: at an importer of an IBOC digital radio broadcasting system: establishing a data link to an audio client configured to buffer audio from an audio source over a buffering duration, to produce buffered audio; receiving, from the audio client, an indication of the buffering duration; identifying a logical channel of an IBOC waveform assigned to the audio client and configured to transmit PDUs of the audio at a PDU rate; computing a quantized number of PDUs that is greater than one into which the buffered audio is to be divided at the audio client based on the buffering duration and the PDU rate; sending, to the audio client, an indication of the quantized number of the PDUs; and upon sending importer data requests to the audio client over the data link, receiving, from the audio client, client data responses each including the quantized number of the PDUs.

20 Claims, 10 Drawing Sheets

(51) Int. Cl.

| | |
|---|---|
| ***H04H 20/42*** | (2008.01) |
| ***H04H 60/07*** | (2008.01) |
| ***H04W 4/00*** | (2018.01) |

(56) References Cited

U.S. PATENT DOCUMENTS

| | | | | |
|---|---|---|---|---|
| 9,350,471 | B1 * | 5/2016 | Haggerty | H04W 4/18 |
| 12,579,980 | B2 * | 3/2026 | Luncan | G10L 15/22 |
| 2009/0157412 | A1 | 6/2009 | Iannuzzelli | |
| 2010/0091728 | A1 * | 4/2010 | Kim | H04W 72/04 370/329 |
| 2011/0032924 | A1 * | 2/2011 | Lee | H04W 76/28 370/345 |
| 2011/0051643 | A1 * | 3/2011 | Hans | H04L 5/0087 370/311 |
| 2012/0189069 | A1 | 7/2012 | Iannuzzelli et al. | |
| 2016/0007240 | A1 * | 1/2016 | Belghoul | H04W 76/27 370/331 |
| 2019/0296789 | A1 * | 9/2019 | Yu | H04B 1/401 |
| 2021/0006614 | A1 * | 1/2021 | Oyman | H04N 19/30 |

* cited by examiner

QUANTIZED TRANSPORT FOR IMPORTER-EXPORTER AUDIO CLIENT IN DIGITAL RADIO BROADCAST

CROSS-REFERENCE TO RELATED APPLICATIONS

This application is a national phase entry under 35 U.S.C. § 371 of International Application No. PCT/US2022/047725, filed Oct. 25, 2022, which claims the benefit of U.S. Provisional Application No. 63/273,779, filed Oct. 29, 2021, all of which are hereby incorporated by reference in their entirety

TECHNICAL FIELD

This disclosure relates to digital radio broadcasting.

BACKGROUND

An in-band on channel (IBOC) digital radio broadcast transmitter includes an importer-exporter system that collects audio from an audio client and formats the audio for transmission over-the-air (OTA) on a logical channel of an IBOC waveform to which the audio client is assigned. An importer of the importer-exporter system sends, to the audio client, importer data requests (also referred to as "PDU requests") for the audio at a PDU rate set by a type of the logical channel (i.e., a channel type). In response, the audio client sends, to the importer, PDUs that carry the audio. Conventionally, the importer sends an importer data request every "PDU interval," and the audio client responds every PDU interval with one PDU, where the "PDU interval" is an inverse of the PDU rate of the logical channel. In this arrangement, the importer data request rate matches the PDU rate of the logical channel. The audio client may be integrated with the importer. Alternatively, the audio client may be located miles away from the importer at a source of the audio, in which case the audio client and the importer may exchange the importer data requests and the PDUs over a data link, such as a Transmission Control Protocol (TCP)/Internet Protocol (IP) (TCP/IP) connection.

The audio client samples audio from the audio source, compresses or encodes the sampled audio, and then builds the PDUs from the compressed audio before sending the PDUs to the importer. In a case where the assigned logical channel dictates a high PDU rate, or a correspondingly short PDU request interval (e.g., less than 200 msec), latency introduced by the data link may render the data link unable to complete a full transfer of the PDU from the audio client to the importer in the PDU interval. This prevents the IBOC waveform from transmitting the audio on a real-time basis and audio may be lost.

Example channel types for the logical channel may include a frame-rate (FR) channel and a block-pair-rate (BPR) channel (sometimes referred to simply as a "block-pair" or "BP" channel). For a frame-rate channel, the importer requests PDUs from the audio client at a frame-rate (e.g., once every 1.486 sec), to which the audio client responds with one frame of (compressed/encoded) audio per PDU request. For a BP channel, the importer requests PDUs at a block-pair-rate (e.g., once every 186 msec), to which the audio client responds with one block-pair (BP) of (encoded) audio per PDU request. It has been shown that a transfer latency of a PDU across a long, or delay-prone, data link can be far greater than the 186 msec PDU interval for a BP PDU, for example. Under such conditions, the audio client cannot provide the PDUs to the importer at the PDU rate established for OTA transmission.

DESCRIPTION OF EMBODIMENTS

Embodiments

Figure 1:
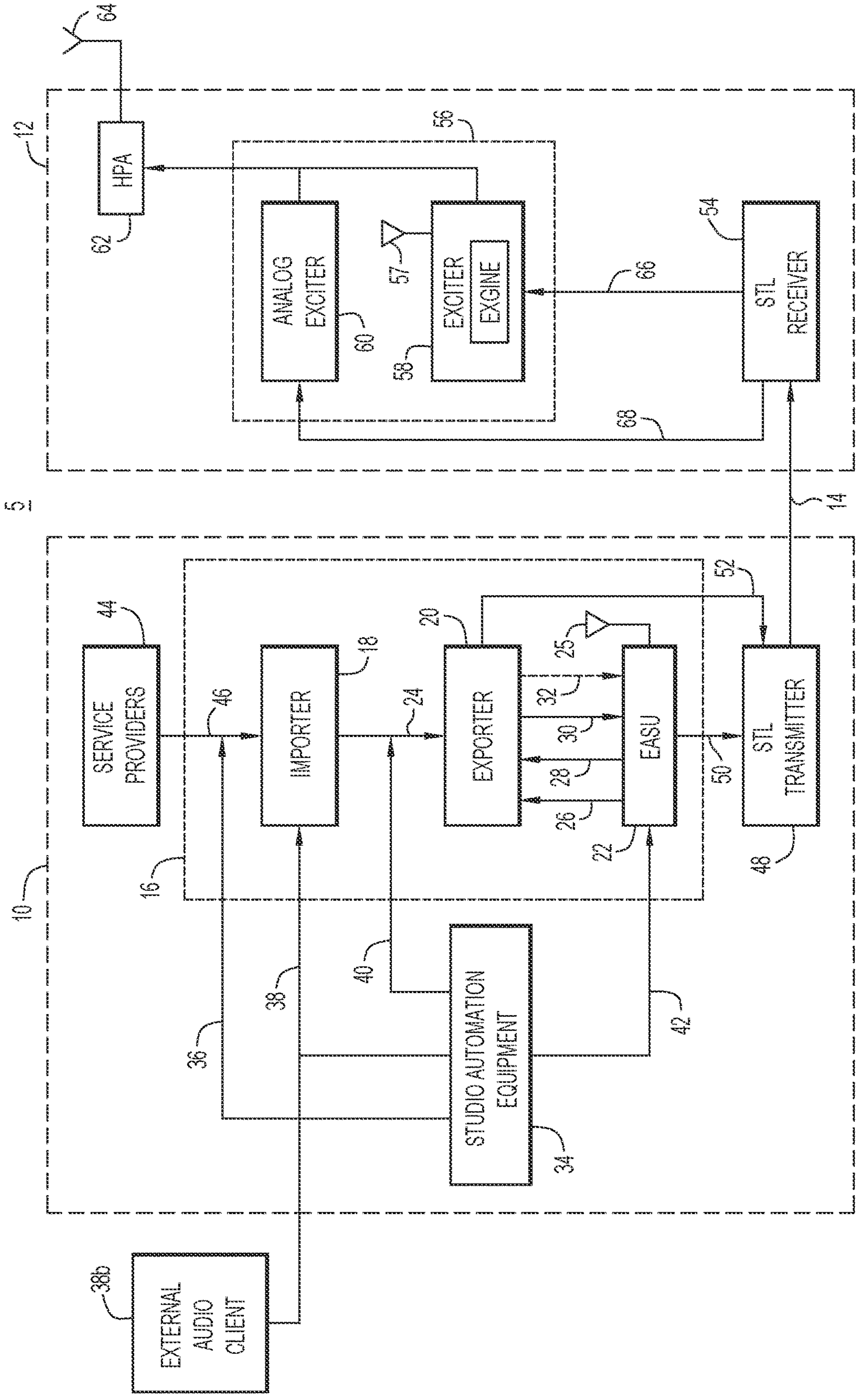
FIG. 1 is a block diagram of an example in-band on-channel (IBOC) digital radio broadcasting system.

Embodiments presented herein provide a quantized transport system and method that provides flexibility for the transport of audio PDUs (referred to simply as "PDUs") from an audio client to an importer-exporter system (Imp-Exp) of an IBOC digital radio broadcasting system/transmitter. The audio client may be co-located/integrated with the Imp-Exp or may be located at a remote location at the source of audio, for example. The remotely located audio client may communicate with the Imp-Exp over a data link, such as a TCP/IP connection. The data link may introduce latency between the audio client and the Imp-Exp system that exceeds a PDU interval corresponding to a PDU rate of a logical channel of an IBOC waveform to which the audio client is assigned. The PDU rate is the rate at which the logical channel provides the PDUs for OTA transmission. Such latency can prevent the audio client from providing PDUs to the Imp-Exp in real-time, which causes a loss of audio content in the OTA transmission. Accordingly, quantized transport embodiments presented herein introduce and control PDU buffering at the audio client and the importer of the Imp-Exp to mitigate the effects of data link latency.

According to the quantized transport embodiments, the audio client "buffers-up" a quantized number (QN) of PDUs before transmitting any PDUs to the Imp-Exp. Then, in response to an importer data request from the importer, the audio client transmits the quantized number of PDUs to the importer all at once as a block or in a data burst. The process repeats such that each importer data request from the importer solicits exactly the quantized number of PDUs from the audio client. Since each importer data request returns multiple PDUs at a time from the audio client per request (instead of only one PDU per request), the importer data request rate is less than the actual PDU rate set by the logical channel to which the audio client is assigned. In other words, the importer data request interval (i.e., the time interval between importer data requests) exceeds the actual PDU interval of the logical channel. The PDU buffering and corresponding extension of the importer data request interval across the data link helps prevent loss of audio that might otherwise occur without the extension. The buffering has been shown to be particularly helpful when the actual PDU rate is very high, e.g., when the actual PDU interval is less than 200 msec.

The audio client buffers the quantized number of PDUs, which allows the decrease in the importer data request rate (and correspondingly the increase in the importer data request interval). The quantized number of PDUs is flexible and may be adjusted easily depending on latency conditions across the data link. For example, an audio client assigned to a BP-rate channel (i.e., a logical channel that operates at the BP-rate) may be configured to operate the same way as a client assigned to a frame-rate channel (i.e., a logical channel that operates at the frame-rate), which has a PDU interval that is 8 times that of the BP-rate channel. In this case, even though the BP-rate channel transmits PDUs OTA at the BP-rate (i.e., once every BP-rate interval), the importer data request rate used to solicit PDUs from the audio client is at the slower frame-rate (i.e., only once per frame-rate interval), instead of at the BP-rate interval. The buffering choices may range from 2 to 64 times a default of the BP-rate interval, for example.

The embodiments give a user the flexibility to select a buffering quantization appropriate for a unique client-importer topology. That is, the quantized transport embodiments advantageously offer variable settings to handle various topographies of audio client-importer location arrangements. This flexibility allows accommodation of unforeseen requirements in the future. Moreover, the quantized transport embodiments are backwards compatible with present audio client-importer interfaces that use real-time PDU requests, which each solicit, and return, a single PDU. Even further, the quantized transport embodiments allow PDU request/response transmission over long-distance delay-prone data links. This allows the audio to be sourced from a centralized location relative to a location of actual radio broadcast transmission equipment.

The quantized transport embodiments may be implemented in digital radio broadcasting technology configured to deliver digital audio and data services to mobile, portable, and fixed receivers. One type of digital radio broadcasting, referred to as in-band on-channel (IBOC) digital radio broadcasting (sometimes referred to as IBOC digital audio broadcasting (DAB)), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception. IBOC signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals.

The HD Radio system allows multiple services to share the broadcast capacity of a single station, and to simultaneously transmit both digitized audio and data. Thus, the technology also allows for wireless data services from AM and FM radio stations. First generation (core) services include a Main Program Service (MPS) and the Station Information Service (SIS). Second generation services, referred to as Advanced Application Services (AAS), include information services providing, for example, multicast programming, electronic program guides, navigation maps, traffic information, multimedia programming and other content. The AAS Framework provides a common infrastructure to support the developers of these services. The AAS Framework provides a platform for a large number of service providers and services for terrestrial radio. It has opened up numerous opportunities for a wide range of services (both audio and data) to be deployed through the system.

An IBOC digital radio broadcasting system, including broadcasting equipment structure and operation, and the structure of IBOC waveforms, is described in connection with FIGS. 1-4, 5A, and 5B. Quantized transport embodiments are then described in connection with FIGS. 6-8. The quantized transport embodiments may operate in concert with, or as part of, the IBOC digital radio broadcasting system.

IBOC System and Waveforms

FIG. 1 is a functional block diagram of an example IBOC digital radio broadcasting system 5 (also referred to as an "IBOC digital radio transmission system"). IBOC digital radio broadcasting system 5 includes a studio site 10, an FM transmitter site 12, and a studio transmitter link (STL) 14 that collectively generate and broadcast an FM IBOC signal. The studio site includes, among other things, studio automation equipment 34, an Ensemble Operations Center (EOC) 16 that includes an importer 18, an exporter 20, an exciter auxiliary service unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. The supplemental program service can include supplementary audio content as well as program associated data. In some arrangement, an external audio client **38*b* may provide SPS data 38 to importer 18, as described below in connection with FIGS. 6-8**.

The importer contains hardware and software for supplying advanced application services (AAS). A "service" is content that is delivered to users via an IBOC digital radio broadcast, and AAS can include any type of data that is not classified as MPS, SPS, or Station Information Service (SIS). SIS provides station information, such as call sign, absolute time, position correlated to GPS, etc. Examples of AAS data include real-time traffic and weather information, navigation map updates or other images, electronic program guides, multimedia programming, other audio services, and other content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

At the transmitter site, the STL receiver 54 receives exciter link data, including audio and data signals as well as command and control messages, over the STL link 14. The exciter link data is passed to the exciter 56, which produces the IBOC waveform. The exciter includes a host processor, digital up-converter, RF up-converter, and exgine subsystem 58. The exgine accepts exciter link data and modulates the digital portion of the IBOC waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC signals can be transmitted in both AM and FM radio bands, using a variety of waveforms. The waveforms include an FM hybrid IBOC waveform, an FM all-digital IBOC waveform, an AM hybrid IBOC waveform, and an AM all-digital IBOC waveform. In all IBOC waveforms, a digital signal is modulated using orthogonal frequency division multiplexing (OFDM). OFDM is a parallel modulation scheme in which the data stream simultaneously modulates a large number of orthogonal subcarriers, which are transmitted simultaneously. In the ensuing description, the subcarriers may be referred to as "orthogonal" subcarriers, "OFDM" subcarriers, "digitally modulated" subcarriers, or simply "subcarriers."

Figure 2:
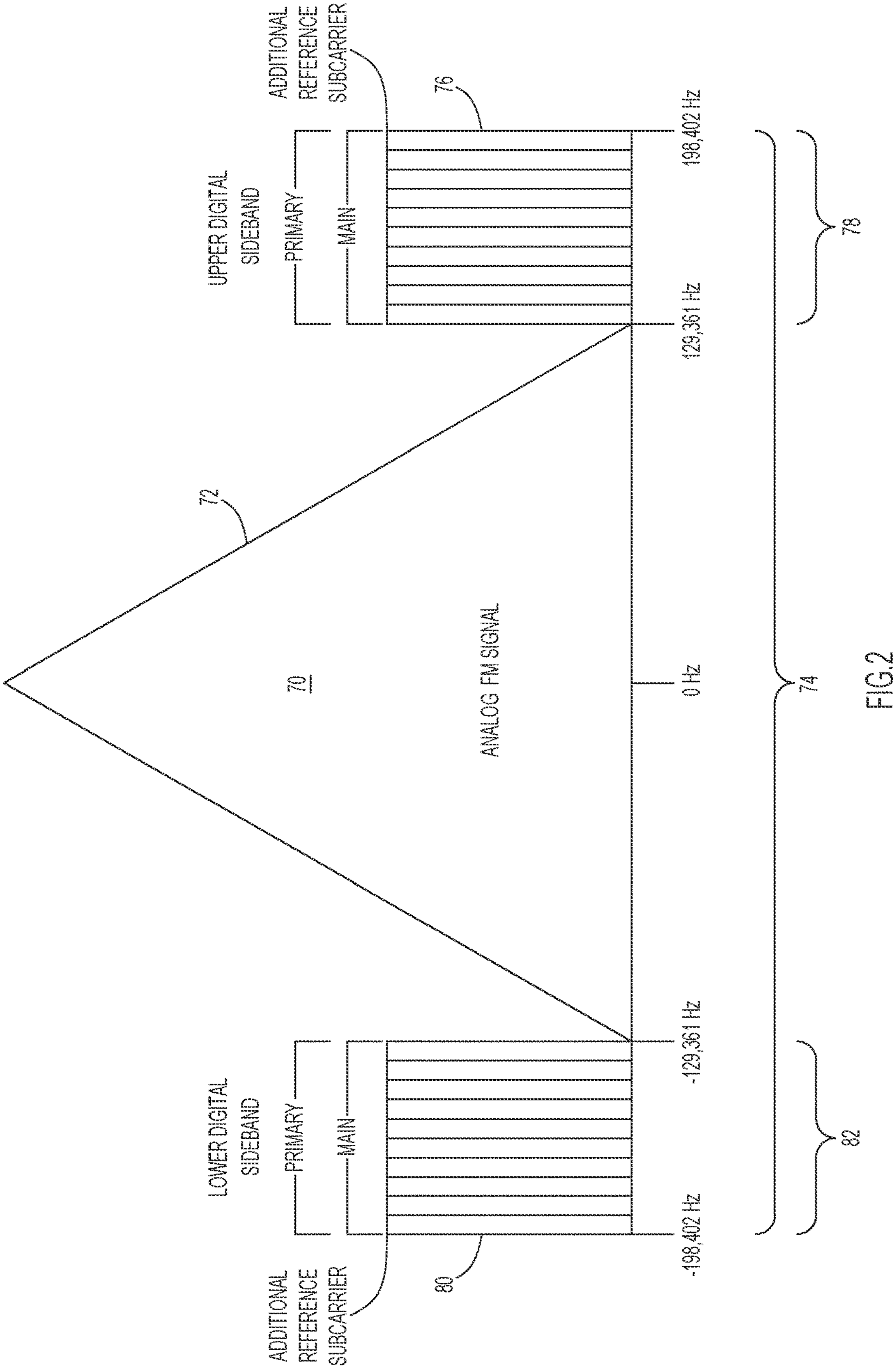
FIG. 2 is a schematic representation of an example hybrid FM IBOC waveform.

Various example IBOC waveforms (sometimes referred to as IBOC DAB waveforms) are now described in connection with FIGS. 2-4, in which the above-mentioned subcarriers are depicted as vertical rectangles. FIG. 2 is a schematic representation of a hybrid FM IBOC waveform 70. The waveform includes an analog FM-modulated signal 72 located in the center of a broadcast channel 74, a first plurality of evenly spaced subcarriers 76 in an upper sideband 78, and a second plurality of evenly spaced subcarriers 80 (depicted as vertical rectangles) in a lower sideband 82. The subcarriers are divided into partitions and various subcarriers are designated as reference subcarriers. A frequency partition is a group of 19 subcarriers containing 18 data subcarriers and one reference subcarrier. The subcarriers are located at evenly spaced frequency locations. The subcarrier locations are numbered from −546 to +546, for example.

Figure 3:
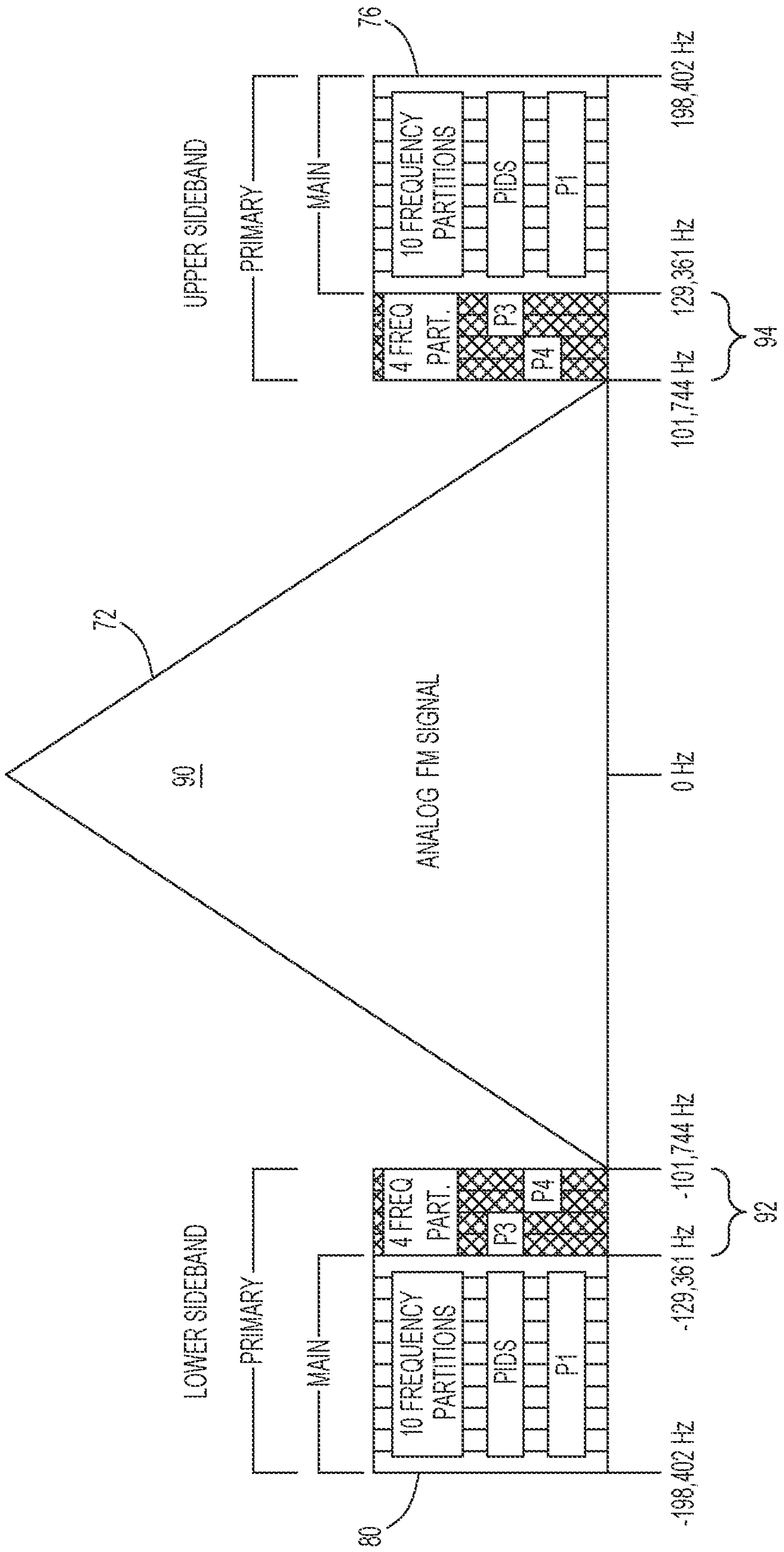
FIG. 3 is a schematic representation of an example extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers and some or all primary extended subcarriers. FIG. 3 depicts a mapping of example primary logical channels (including logical channels P1-P4 and a primary IBOC data service (PIDS) logical channel) to subcarriers, described below in connection with FIGS. 5A and 5B.

Figure 4:
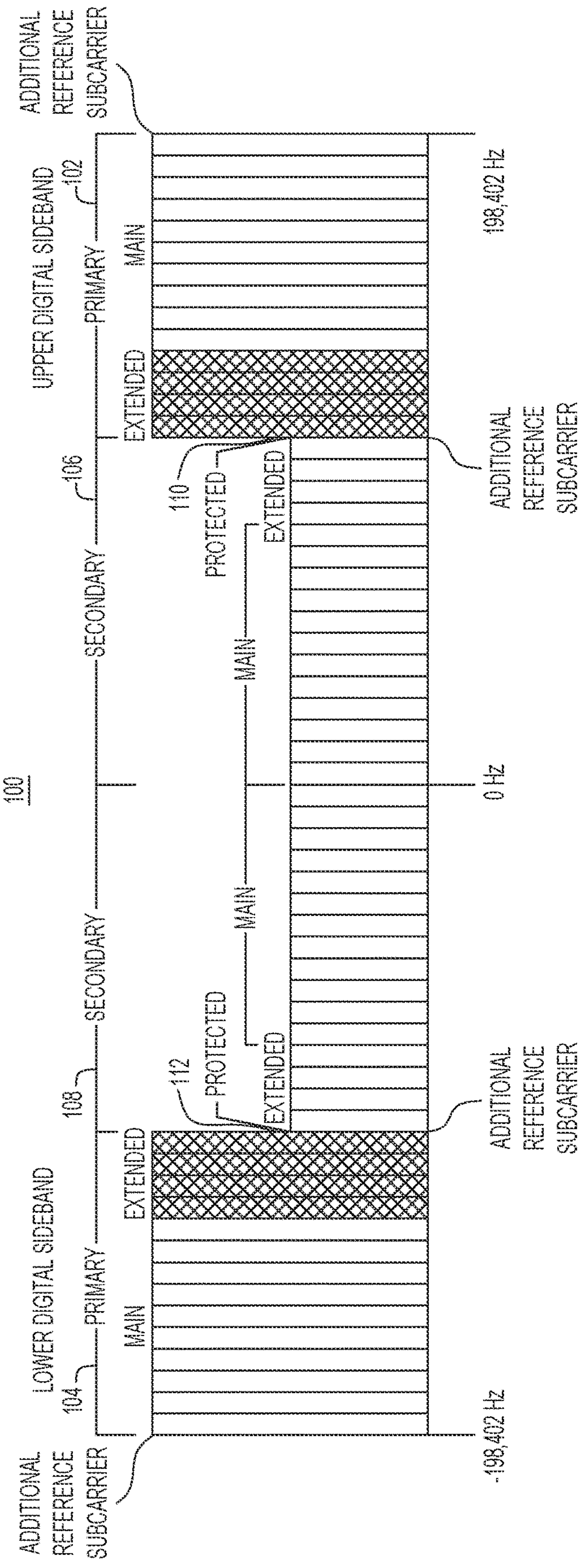
FIG. 4 is a schematic representation of an example all-digital FM IBOC waveform.

FIG. 4 is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers, without an analog FM signal. Each secondary sideband also supports a small secondary protected (SP) region 110, 112 including 12 digitally modulated subcarriers and reference subcarriers. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions. The total frequency span of the entire all-digital spectrum is 396,803 Hz.

IBOC waveforms may further comprise an AM hybrid IBOC signal format, which, in one example, comprises an analog modulated carrier signal plus OFDM subcarrier locations spanning upper and lower bands. Coded digital information representative of the audio or data signals to be transmitted (program material), is transmitted on the subcarriers. The symbol rate is less than the subcarrier spacing due to a guard time between symbols.

Figure 5A:
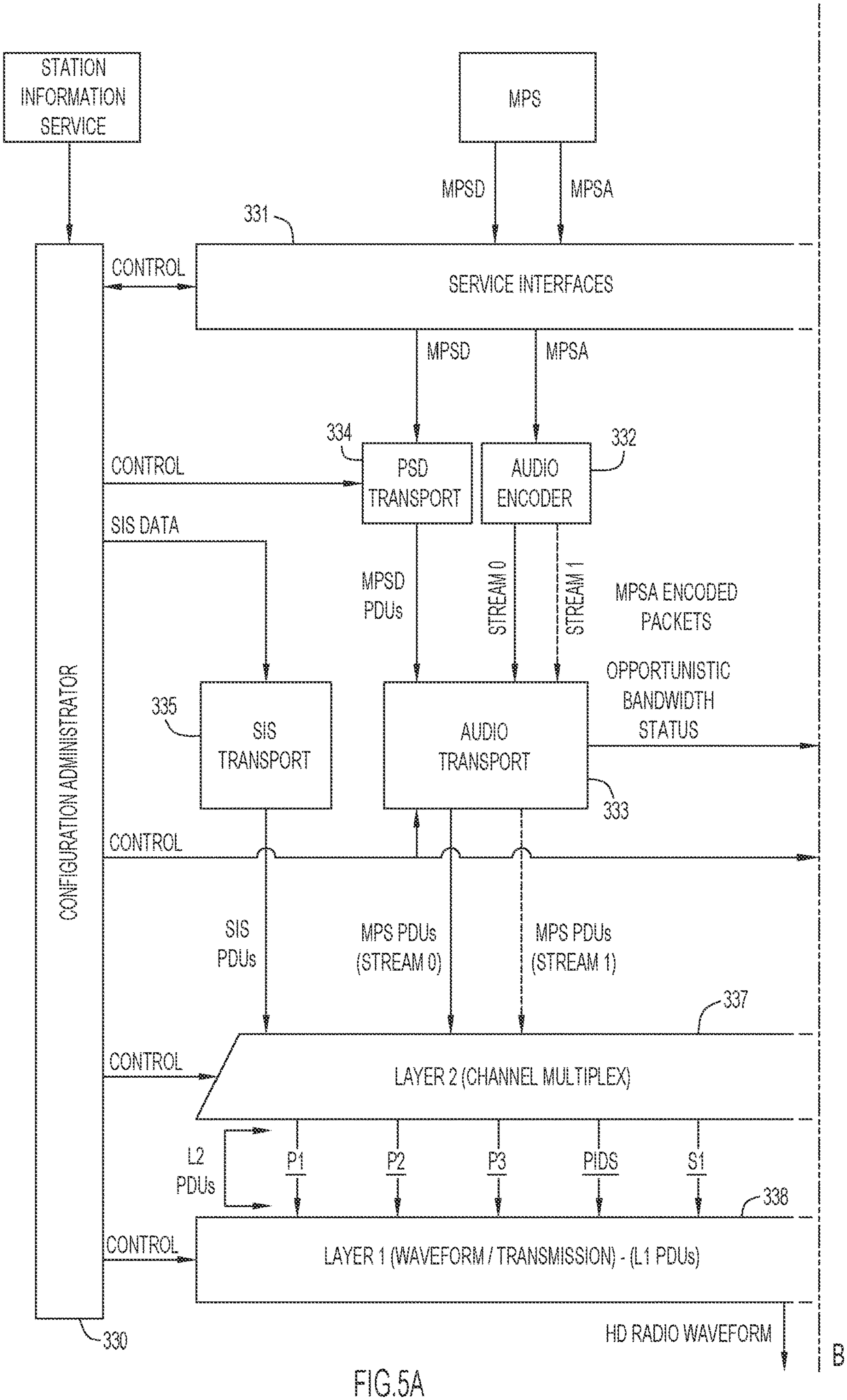
FIGS. 5A and 5B are diagrams of an example IBOC logical protocol stack from a radio broadcast/transmit perspective.
Figure 5B:
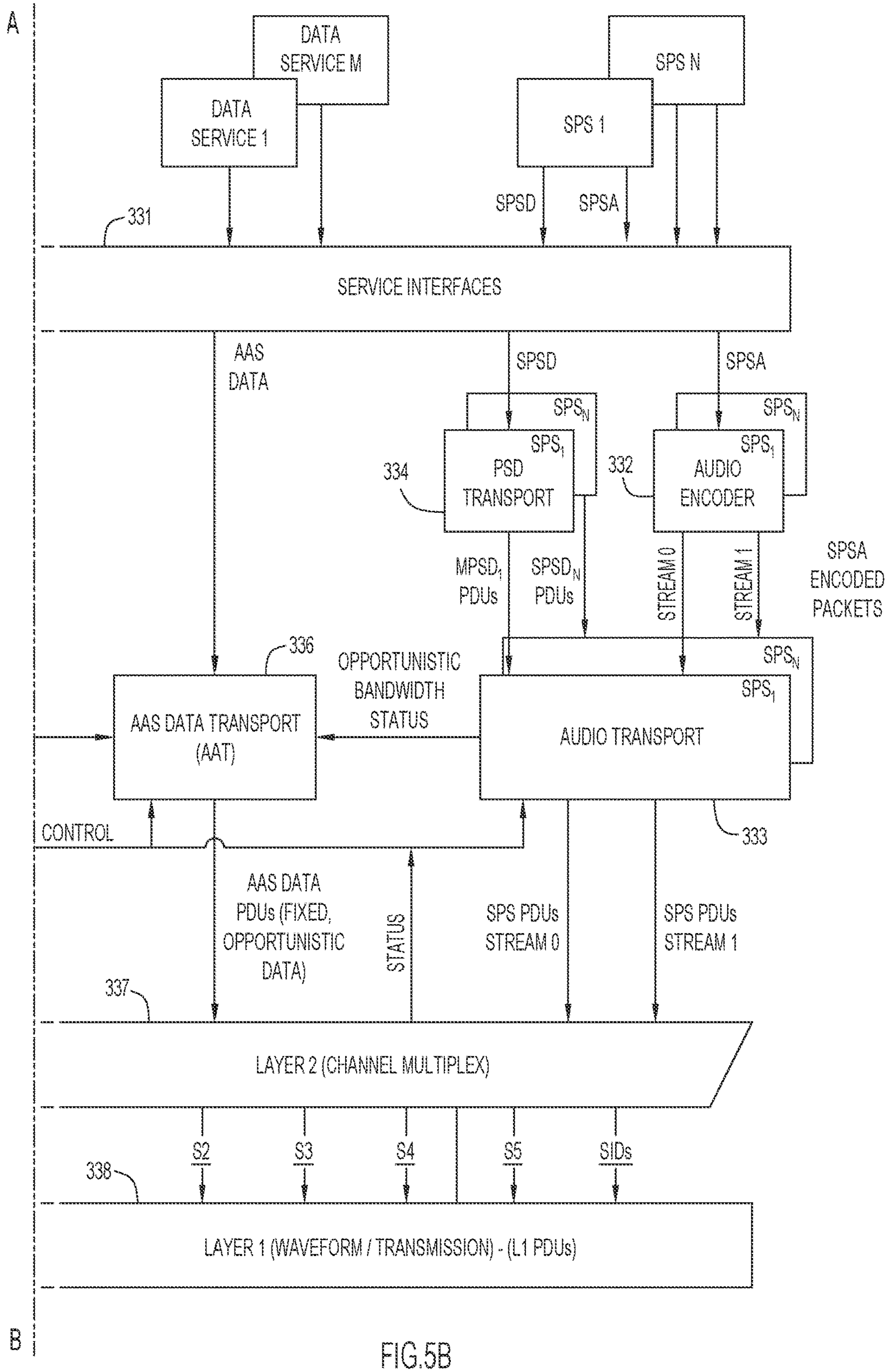

FIGS. 5A and 5B are diagrams of an IBOC logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 5A and 5B, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services except SIS. The service interface may be different for each of the various types of services. For example, for MPS audio and SPS audio, the service interface may be an audio card. For MPS data and SPS data the interfaces may be in the form of different application program interfaces (APIs). For all other data services, the interface is in the form of a single API.

An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by program service data (PSD) transport 334 to produce MPS and SPS data PDUs, which are passed to audio transport 333.

Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, program type, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or LA PDUs.

Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service.

There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. The example of FIGS. 5A and 5B includes primary logical channels P1-P3, the PIDS logical channel, secondary logical channels S1-S5, and a secondary IBOC data service (SIDS) logical channel. The system may support more or less logical channels. Information is also passed between Layer 2 and Layer 1. Layer 1 converts the PDUs from Layer 2 and system control information into an AM or FM IBOC waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

The inherently flexible nature of OFDM allows the mapping or assignment of the logical channels to different groups of subcarriers of the IBOC waveforms, according to the various service modes offered by the IBOC radio broadcasting system, as mentioned above. An example mapping is depicted on the IBOC waveform of FIG. 3, in which primary logical channel P1 and the PIDS logical channel are mapped to the subcarriers of each primary main sideband, and primary logical channels P3, P4 are mapped to the subcarriers of each extended sideband. There are many other alternative mapping schemes not shown in FIG. 3.

The logical channels carry content (e.g., audio) in PDUs at different rates depending on the channel types (e.g., frame-rate or BP-rate types) of the logical channels. Logical channel P1 is a frame-rate channel that is populated with PDUs on a frame-rate basis. In that case, exporter 20 sends requests for PDUs, and receives the PDUs, at the frame-rate, e.g., a PDU is sent once per 1.486 sec. On the other hand, logical channels P3 and P4 are BP channels that are populated with PDUs on a BP-rate basis. In that case, case exporter 20 sends requests for PDUs, and receives the PDUs, at the BP-rate, e.g., a PDU is sent once per 0.186 sec or at ⅛ the frame-rate. For the BP channel, 8 BP PDUs are sent per frame. The size of a PDU is dependent on the channel type (e.g., frame-rate or BP-rate). The BP PDU includes fewer audio packets than the frame-rate PDU.

Quantized Transport Embodiments

Figure 6:
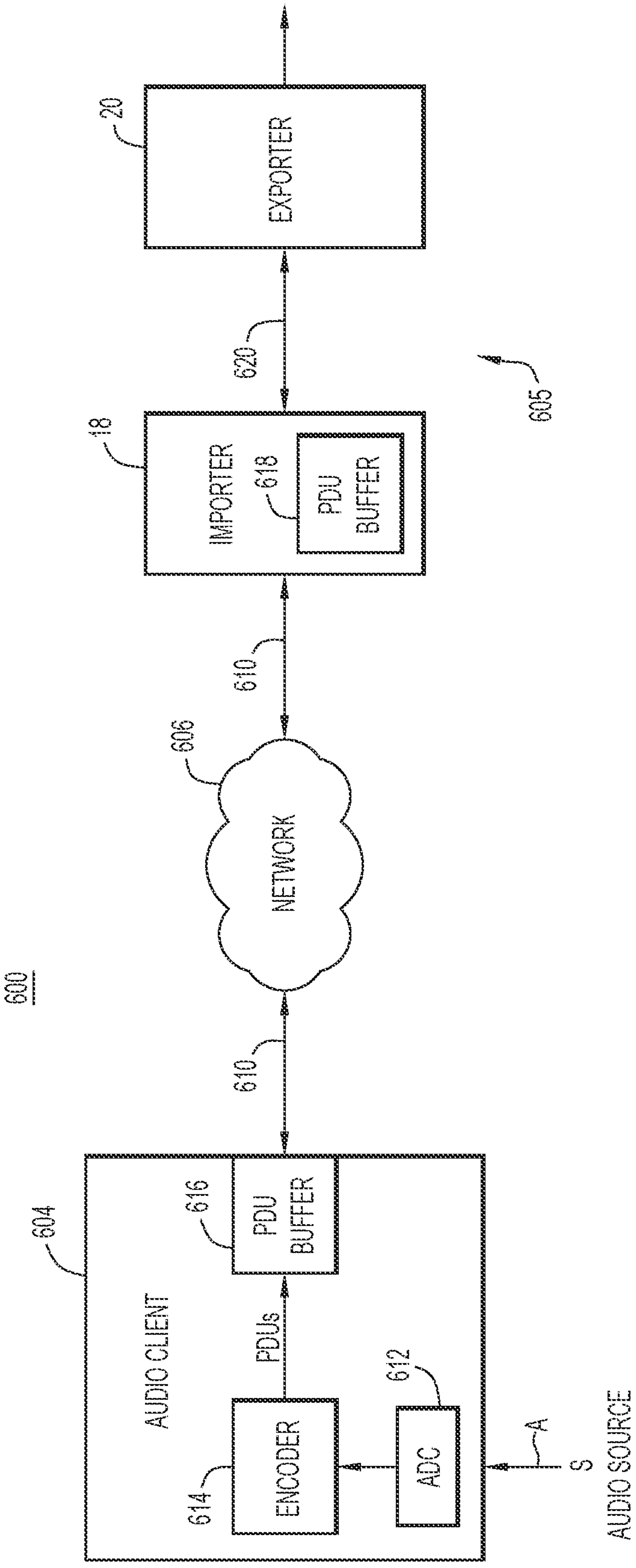
FIG. 6 is a block diagram of an example quantized transport system in which embodiments directed to quantized transport (i.e., quantized transport embodiments) may be implemented.

FIG. 6 is a block diagram of an example quantized transport system 600 in which the quantized transport embodiments may be implemented. Quantized transport system 600 includes an example audio client 604 and an example importer-exporter 605 that includes importer 18 and exporter 20. Audio client may be integrated with any of service providers 44 or studio automation equipment 34, or may represent a separate or external entity (represented as external audio client 38*b* in FIG. 1) that is not associated with the service providers or the studio automation, for example. Audio client 604 may be located a long distance from importer 18, but near to a source S of audio A. The audio A may be associated with SPS audio 38 and SPS data 36 provided to importer 18, for example.

In an example, audio client 604 may include a computer device (i.e., an audio client device) that hosts a client audio application configured to implement embodiments presented herein. Audio client 604 and importer 18 may each be connected to a communication network 606, and may communicate with each other over a data link 610 that spans the communication network. Communication network 606 may include one or more wide area networks (WANs), such as the Internet, and one or more local area networks (LANs), for example. Data link 610 may include one or more of a network connection, terrestrial radio links, satellite links, and the like, established by and between audio client 604 and importer 18. The network connection may include a TCP/IP connection between audio client 604 and importer 18, for example.

Figure 7:
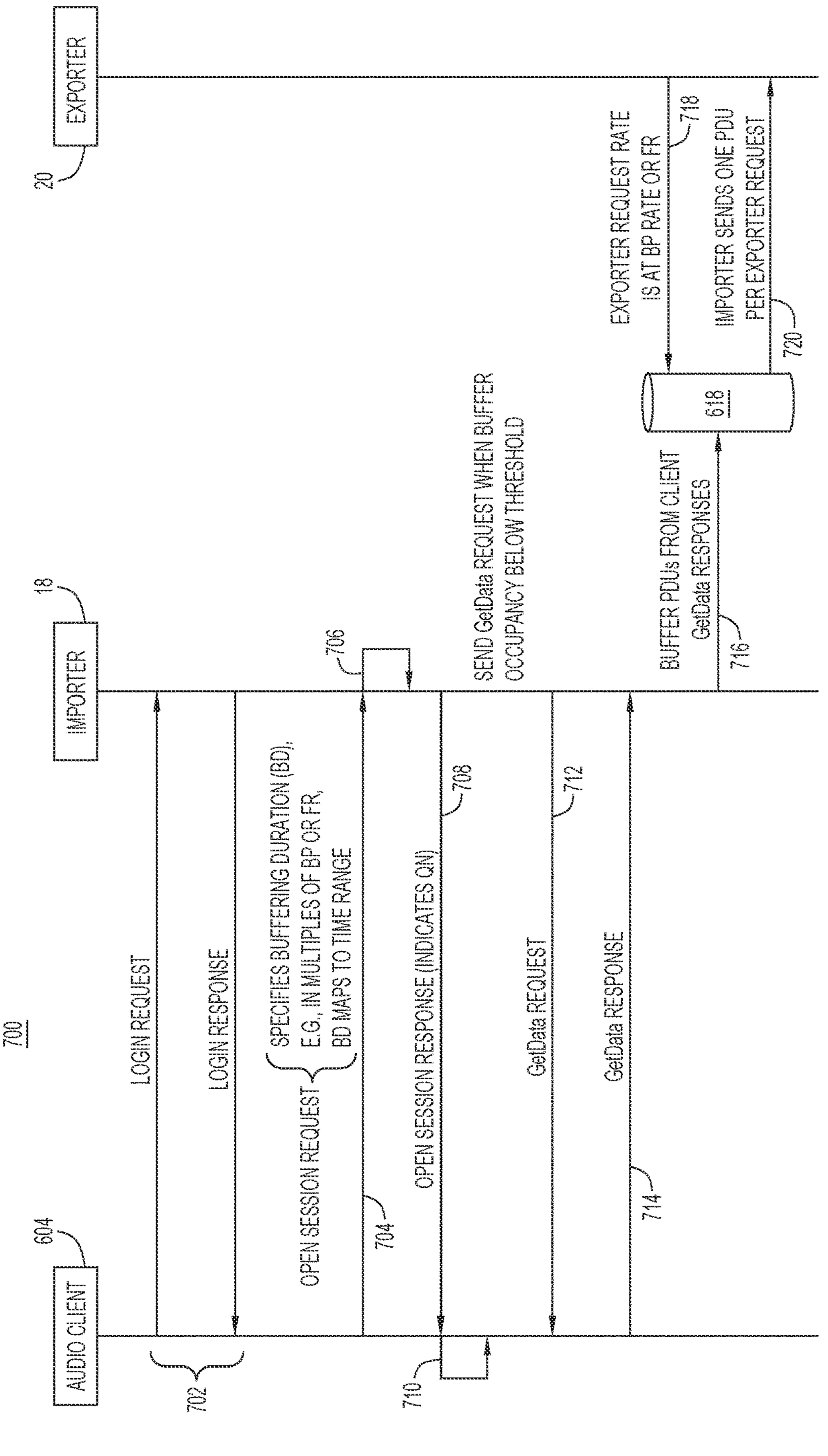
FIG. 7 is a transaction diagram of example message exchanges in, and operations performed by, the quantized transport system of FIG. 6 to implement the quantized transport embodiments.

Audio client 604 includes an analog-to-digital (ADC) 612, an audio encoder 614 (e.g., an audio coder or codec), and a PDU buffer 616. Importer 18 includes a PDU buffer 618, and communicates with exporter 20 over an Imp-Exp interface 620. Operation of quantized transport system 600 is now described in connection with FIG. 7. FIG. 7 is a transaction diagram of example exchanges 700 between, and operations performed by, audio client 604, importer 18, and importer 20 of quantized transport system 600 to implement the quantized transport embodiments.

In the example of FIG. 7, importer 18 and exporter 20 are configured to supply transmit PDUs to a logical channel of an IBOC waveform at a PDU rate (i.e., once every PDU interval) defined by a channel type assigned to audio client 604 (i.e., to audio A supplied by the audio client). Audio client 604 may be unaware of the channel type. For example, the channel type may be a BP channel that operates at the BP-rate (e.g., one BP interval per PDU) or a frame-rate channel that operates at the frame rate (e.g., one PDU per fame interval). Initially, a user configures or programs audio client 604 to buffer audio over a buffering duration. During operation, audio client 604 buffers the audio over the buffering duration, before the audio client releases the buffered audio to importer 18 in response to any importer data requests sent by the importer. The buffering duration is greater than the PDU interval for the channel to which audio client 604 is assigned.

At 702, audio client 604 and importer 18 establish a data link (e.g., data link 610) between the audio client and the importer. The data link may include a TCP/IP connection over communication network 606, for example. Audio client 604 and importer 18 exchange a login request and a login response over the data link to establish a data session in which the audio client and the importer can exchange various messages, described below.

At 704, audio client 604 sends to importer 18 an open session request that indicates the buffering duration (BD) configured on the audio client. The buffering duration may be defined in multiples of BP-rate or frame-rate PDUs. For example, the buffering duration may be expressed as 1, 2, or 4 BP-rate PDUs, or 1-8 frame-rate PDUs. The BP selection maps to a time duration that ranges from 186 msec (e.g., 1 BP-rate PDU) to 11.888 seconds (sec) (e.g., 8 frame-rate PDUs), for example.

Upon receiving the open session request, at 706, importer 18 computes or determines a number of PDUs that audio client 604 is to buffer before sending any PDU to the importer, based on the channel type to which the audio client is assigned and the buffering duration indicated in the open session request. The number of PDUs is referred to as the "quantized number" of PDUs. For example, importer 18 divides the buffering duration by the PDU interval for the channel type, to produce the quantized number of PDUs. The buffering duration may be presented in terms of a time duration, a number of BP-rate intervals, a number of frame-rate intervals, a rate, and so on, while the PDU interval may be presented correspondingly in terms of a time duration, a number of BP-rate intervals, a number of frame-rate intervals, a rate, and so on.

At 708, importer 18 sends to audio client 604 an open session response that indicates the quantized number of PDUs that the audio client should buffer before sending any PDU to the importer in response to an importer PDU request.

Armed with the quantized number provided by importer 18, at 710, audio client begins building and loading the quantized number of PDUs into PDU buffer 616, in the following manner. Audio client 604 receives a stream of audio A from audio source S. ADC 612 digitizes audio A to produce digitized audio, and audio encoder 614 encodes or compresses the digitized audio, to produce packets of compressed audio (i.e., audio packets). Audio client 604 builds the quantized number of PDUs from the audio packets (e.g., multiple audio packets per PDU), and stores that quantized number of PDUs in PDU buffer 616. The quantized number of PDUs spans the buffering duration. Audio client 604 waits for an importer data request from importer 18. The aforementioned operations performed by audio client 604 repeat over time.

Concurrent with operation 710, at 712, importer 18 periodically sends to audio client 604 importer data requests (each labeled "GetData Request" in FIG. 7) every importer data request interval, which approximates the buffering duration configured on audio client 604. In response to each importer data request, at 714, audio client 604 sends to importer 18 a client data response (labeled "GetData Response" in FIG. 7) that includes the quantized number of PDUs currently available in PDU buffer 616, all at once. When importer 18 receives each quantized number of PDUs, at 716, the importer stores them into PDU buffer 618, which increases a PDU occupancy or fill-level of the PDU buffer (i.e., a number of PDUs in the PDU buffer) by the quantized number of PDUs.

Concurrent with processes 710-716, at 718, exporter 20 repeatedly sends to importer 18 exporter data requests (also referred to as "exporter PDU requests") at the PDU rate of the logical channel, i.e., once every PDU interval defined for the logical channel (which is less than the buffering duration and the importer data request interval). When the channel type is a BP channel, the PDU rate is once per BP interval. When the channel type is a frame-rate channel, the PDU rate is once per frame.

Responsive to each exporter PDU request, at 720, importer 18 sends to exporter 20 a single PDU from PDU buffer 618, which reduces the occupancy of the PDU buffer by one. Importer 18 monitors the occupancy of PDU buffer 618. When the occupancy is equal to or exceeds a predetermined threshold level (i.e., a low level), importer 18 does not send importer data requests to audio client 604. On the other hand, when the occupancy falls below the predetermined threshold level, i.e., each time the occupancy falls below the predetermined threshold level, importer 18 sends one importer data request to audio client 604. In other words, when the occupancy falls below the predetermine threshold triggers, this triggers sending an importer data request.

The quantized transport embodiments may employ the following example configurations for buffering duration, channel type, and quantization number (QN).

Example 1 a. Client buffering duration=1 BP (186 msec=1*186 msec).
b. Client content (e.g., audio) has been allocated to a BP-rate type of channel.
c. Importer sets QN=1.

d. Clients returns 1 PDU worth of data in each GetData Response.

Example 2 a. Client buffering duration=4 BPs (744 msec=4*186).
b. Client content has been allocated to a BP-rate type of channel.
c. Importer sets QN=4.
d. Clients returns 4 PDUs worth of data in each GetData response.

Example 3 a. Client buffering duration=6 Frames (8.916 seconds=6*1.486).
b. Client content has been allocated to a BP-rate type of channel.
c. Importer sets QN=48 (6 frames*8 PDU/frame).
d. Clients returns 48 PDUs worth of data in each GetData response.

Example 4 a. Client buffering duration=4 frames (5.944 seconds=4*1.486).
b. Client content has been allocated to a frame-rate type of channel.
c. Importer sets QN to 4 (4 frames*1 PDU/frame).
d. Clients returns 4 PDUs worth of data in each GetData response.

Example buffering durations that may be configure on audio client 604 include, but are not limited to 1 BP, 2 BP, or 4 BP (0.186, 0.372, 0.744 sec), 1 FR to 8 FR (1.486, 2.972, . . . , 11.888 sec), and so on.

Figure 8:
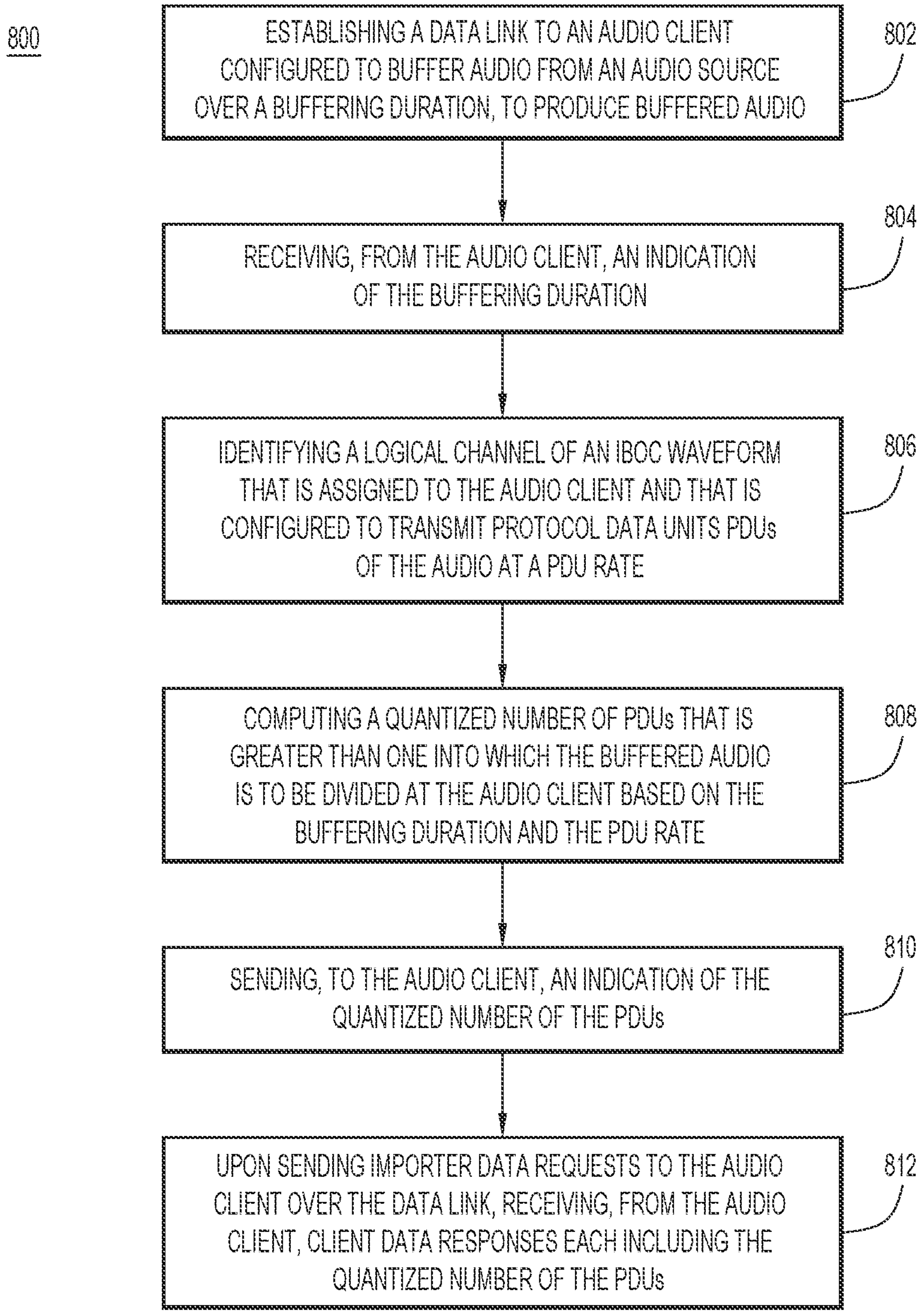
FIG. 8 is a flowchart of an example method of performing quantized transport in connection with the IBOC digital radio broadcasting system.

FIG. 8 is a flowchart of an example method 800 of performing quantized transport in connection with IBOC digital radio broadcasting system 5 that includes importer 18 and exporter 20, as described above. Method 800 includes operations described above. The operations are performed primarily by importer 18, which interacts with exporter 20 and audio client 604.

802 includes establishing a data link to the audio client, which is configured to buffer audio from an audio source over a buffering duration, to produce buffered audio.

804 includes receiving, from the audio client, an indication of the buffering duration (e.g., in multiples of BP-rate PDUs or frame-rate PDUs, although other formats are possible).

806 includes identifying which logical channel of an IBOC waveform is assigned to the audio client. The identifying includes accessing configuration information on the importer or exporter that indicates the logical channel and its channel type (e.g., frame-rate or BP-rate). The logical channel is configured to transmit PDUs of the audio at a PDU rate, i.e., every PDU interval, dictated by the channel type.

808 includes computing a quantized number of PDUs that is greater than one into which the buffered audio is to be divided at the audio client based on the buffering duration and the PDU rate. This may include dividing the buffering duration by the PDU interval for the channel type, for example.

810 includes sending, to the audio client, an indication of the quantized number of the PDUs.

812 includes, upon sending importer data requests (also referred to as "first data requests" or "first PDU requests") to the audio client over the data link, receiving, from the audio client, client data responses each including the quantized number of the PDUs. The importer supplies the received PDUs to the exporter for OTA transmission on the logical channel.

The importer further performs:

a. Buffering the quantized number of the PDUs received in each client data response in an importer buffer (e.g., PDU buffer 618).
b. Upon receiving exporter data requests (also referred to as "second data requests" or "second PDU requests") from the exporter of the IBOC digital radio broadcasting system, sending the PDUs from the importer buffer to the exporter.
c. Monitoring an occupancy of the PDUs in the importer buffer that increases when buffering the quantized number of PDUs from each client data response and decreases when sending the PDUs as buffered to the exporter.
d. When the occupancy falls below a threshold level, triggering sending the importer data requests to the audio client. Otherwise, not sending the importer data requests.

The audio client performs:

a. Upon receiving, from the importer, the indication of the quantized number of the PDUs, buffering the quantized number of PDUs and waiting to receive the importer data requests.
b. Upon receiving each importer data request, sending the quantized number of the PDUs to the importer, such that a PDU interval corresponding to the PDU rate of the logical channel is less than an interval between successive ones of the importer data requests.

The buffering duration configured on the audio client exceeds the PDU interval corresponding to the PDU rate of the logical channel, such that the interval between successive importer data requests is greater than the PDU interval, in order to compensate for transmission drops on the data link between the audio client and the importer. In other words, the rate at which the importer sends the importer data requests to the audio client over the data link is less than the PDU rate of the logical channel. A data rate at which the data link operates may be sufficiently high that a time taken to transmit the quantized number of PDUs from the audio client to the importer occupies only a small fraction (e.g., less than 1%) of a PDU interval between successive importer data requests. As a result, data-link outages during the other 99% of the PDU interval when there are no PDUs traversing the data link do not negatively impact transmission of the PDUs over the data link. This arrangement compensates for transmission drops or data-link outages that may occur during the 99% of the PDU interval.

Computer Device

Figure 9:
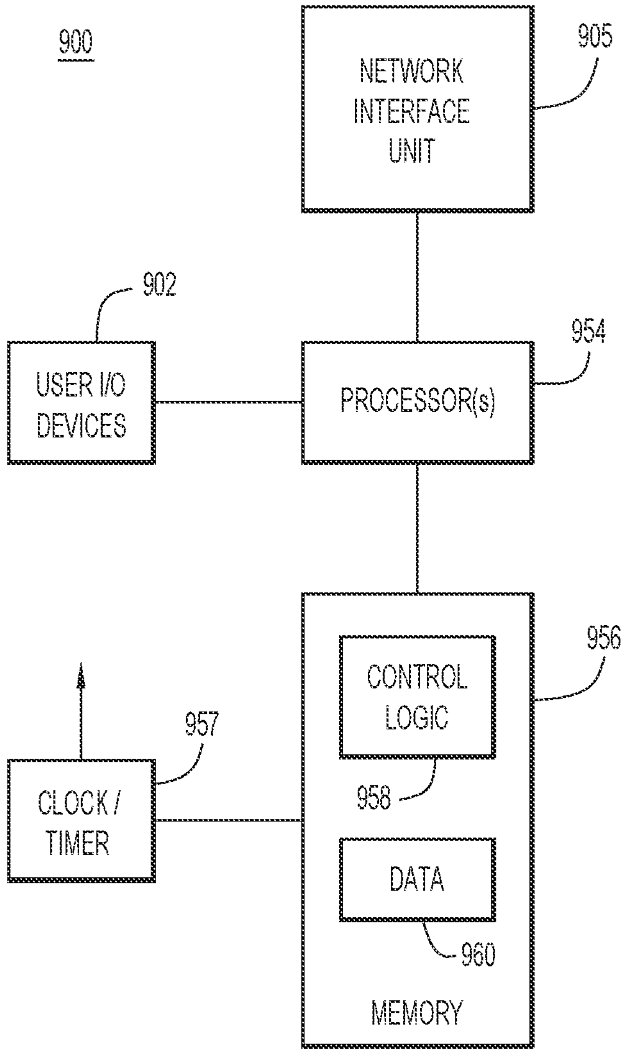
FIG. 9 is a block diagram of an example computer device that may be implemented in an audio client and an importer-exporter of the IBOC digital radio broadcasting system to perform operations described herein.

FIG. 9 is a block diagram of an example controller or computer device 900 that may be implemented in any of an audio client, and an importer and an exporter of an IBOC digital radio system to perform operations described herein. There are numerous possible configurations for computer device 900 and FIG. 9 is meant to be an example. Examples of computer device 900 include a tablet computer, a personal computer, a laptop computer, a mobile phone, such as a smartphone, computer equipment at a radio broadcast station, a studio site, and so on. Computer device 900 may represent a controller of any of the aforementioned components.

Computer device 900 may include user input/output (I/O) devices 902 including a display, keyboard, and the like to enable a user to enter information into and receive information from the computer device. Computer device 900 includes a hardware and/or software implemented network interface unit 905 to communicate with a wired and/or wireless communication network, and to control devices over the network. Computer device 900 also includes a processor 954 (or multiple processors, which may be implemented as software or hardware processors), and memory 956. Computer device further includes a clock/timer subsystem 957 to provide various clock and timing signals to other components. Network interface unit 905 may include an Ethernet card with a port (or multiple such devices) to communicate over wired Ethernet links and/or a wireless communication card with a wireless transceiver to communicate over wireless links. When computer device 900 represents a controller of an importer, network interface unit 905 may communicate with an audio client over a communication network connection. Similarly, when the computer device 900 represents a controller of an audio client, network interface unit 905 may communicate with an importer over a communication network connection.

Memory 956 stores instructions for implementing methods described herein. Memory 956 may include read only memory (ROM), random access memory (RAM), magnetic disk storage media devices, optical storage media devices, flash memory devices, electrical, optical, or other physical/tangible (non-transitory) memory storage devices. The processor 954 is, for example, a microprocessor or a microcontroller that executes instructions stored in memory. Thus, in general, the memory 956 may comprise one or more tangible computer readable storage media (e.g., a memory device) encoded with software comprising computer executable instructions and when the software is executed (by the processor 954) it is operable to perform (e.g., cause the processor to perform) the operations described herein. For example, memory 956 stores control logic 958 to perform operations described herein, for example, operations performed by an importer, an exporter, an audio client, and so on.

The memory 956 may also store data 960 used and generated by control logic 958.

Note that in this Specification, references to various features (e.g., elements, structures, modules, components, logic, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations described with reference to the preceding figures illustrate only some of the possible scenarios that may be executed by one or more entities and components discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

Additionally, unless expressly stated to the contrary, the terms 'first', 'second', 'third', etc., are intended to distinguish the particular nouns they modify (e.g., element, condition, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Although the techniques are illustrated and described herein as embodied in one or more specific examples, it is nevertheless not intended to be limited to the details shown, since various modifications and structural changes may be made within the scope and range of equivalents of the claims.

In summary, in some aspects, the techniques described herein relate to a method including: at an importer of an in-band on-channel (IBOC) digital radio broadcasting system: establishing a data link to an audio client configured to buffer audio from an audio source over a buffering duration, to produce buffered audio; receiving, from the audio client, an indication of the buffering duration; identifying a logical channel of an IBOC waveform that is assigned to the audio client and that is configured to transmit protocol data units (PDUs) of the audio at a PDU rate; computing a quantized number of PDUs that is greater than one into which the buffered audio is to be divided at the audio client based on the buffering duration and the PDU rate; sending, to the audio client, an indication of the quantized number; and upon sending importer data requests to the audio client over the data link, receiving, from the audio client, client data responses each including the quantized number of the PDUs.

In some aspects, the techniques described herein relate to a method, wherein: sending the importer data requests to the audio client over the data link includes sending the importer data requests at a rate that is less than the PDU rate of the logical channel.

In some aspects, the techniques described herein relate to a method, further including, at the importer: buffering the quantized number of the PDUs received in each client data response in an importer buffer; and upon receiving exporter data requests from an exporter of the IBOC digital radio broadcasting system, sending the PDUs from the importer buffer to the exporter.

In some aspects, the techniques described herein relate to a method, further including: monitoring an occupancy of the PDUs in the importer buffer that increases when buffering the quantized number of PDUs from each client data response and decreases when sending the PDUs as buffered to the exporter; and when the occupancy falls below a threshold level, triggering sending the importer data requests to the audio client.

In some aspects, the techniques described herein relate to a method, wherein: receiving the exporter data requests includes receiving the exporter data requests at the PDU rate of the logical channel; and sending the PDUs from the importer buffer includes sending one of the PDUs from the importer buffer for each exporter data request.

In some aspects, the techniques described herein relate to a method, wherein the PDU rate of the logical channel is a block-pair-rate or a frame-rate that is a multiple of the block-pair-rate.

In some aspects, the techniques described herein relate to a method, wherein the PDU rate of the logical channel is the block-pair-rate and the buffering duration corresponds to multiple block-pair-rate PDUs.

In some aspects, the techniques described herein relate to a method, further including, at the audio client: upon receiving, from the importer, the indication of the quantized number of the PDUs, buffering the quantized number of PDUs and waiting to receive the importer data requests; and upon receiving each importer data request, sending the quantized number of the PDUs to the importer, such that a PDU interval corresponding to the PDU rate of the logical channel is less than an interval between successive ones of the importer data requests.

In some aspects, the techniques described herein relate to a method, wherein: establishing includes establishing the data link to include a Transmission Control Protocol (TCP)/ Internet Protocol (IP) (TCP/IP) connection.

In some aspects, the techniques described herein relate to a method, wherein: the buffering duration configured on the audio client exceeds a PDU interval corresponding to the PDU rate of the logical channel, such that an interval between successive ones of the importer data requests is greater than the PDU interval, in order to compensate for transmission drops on the data link between the audio client and the importer.

In some aspects, the techniques described herein relate to a method, wherein the audio includes encoded audio.

In some aspects, the techniques described herein relate to a system including: an importer of an in-band on-channel (IBOC) digital radio broadcast system, the importer configured to perform: establishing a data link to an audio client configured to buffer audio from an audio source over a buffering duration, to produce buffered audio; receiving, from the audio client, an indication of the buffering duration; identifying a logical channel of an IBOC waveform that is assigned to the audio client and configured to transmit protocol data units (PDUs) of the audio at a PDU rate; computing a quantized number of PDUs that is greater than one into which the buffered audio is to be divided at the audio client based on the buffering duration and the PDU rate; sending, to the audio client, an indication of the quantized number; and upon sending importer data requests to the audio client over the data link, receiving, from the audio client, client data responses each including the quantized number of the PDUs.

In some aspects, the techniques described herein relate to a system, wherein the importer is configured to perform: sending the importer data requests to the audio client over the data link by sending the importer data requests at a rate that is less than the PDU rate of the logical channel.

In some aspects, the techniques described herein relate to a system, further including an exporter of the IBOC digital radio broadcast system, wherein the importer is further configured to perform: buffering the quantized number of the PDUs received in each client data response in an importer buffer; and upon receiving exporter data requests from the exporter, sending the PDUs from the importer buffer to the exporter.

In some aspects, the techniques described herein relate to a system, wherein the importer is further configured to perform: monitoring an occupancy of the PDUs in the importer buffer that increases when buffering the quantized number of PDUs from each client data response and decreases when sending the PDUs as buffered to the exporter; and when the occupancy falls below a threshold level, triggering sending the importer data requests to the audio client.

In some aspects, the techniques described herein relate to a system, wherein: receiving the exporter data requests includes receiving the exporter data requests at the PDU rate of the logical channel; and sending the PDUs from the importer buffer includes sending one of the PDUs from the importer buffer for each exporter data request.

In some aspects, the techniques described herein relate to a system, wherein the audio client is configured to perform: upon receiving, from the importer, the indication of the quantized number of the PDUs, buffering the quantized number of PDUs and waiting to receive the importer data requests; and upon receiving each importer data request, sending the quantized number of the PDUs to the importer, such that a PDU interval corresponding to the PDU rate of the logical channel is less than an interval between successive ones of the importer data requests.

In some aspects, the techniques described herein relate to a system, wherein: the buffering duration exceeds a PDU interval corresponding to the PDU rate of the logical channel, such that an interval between successive ones of the importer data requests is greater than the PDU interval, in order to compensate for transmission drops on the data link between the audio client and the importer.

In some aspects, the techniques described herein relate to a system including: an importer of an in-band on-channel (IBOC) digital radio broadcast system, the importer configured to perform: establishing a data link to an audio client configured to buffer audio from an audio source over a buffering duration, to produce buffered audio; receiving, from the audio client, an indication of the buffering duration; identifying a logical channel of an IBOC waveform that is assigned to the audio client and configured to transmit protocol data units (PDUs) of the audio at a PDU rate corresponding to a PDU interval that is less than the buffering duration; computing a quantized number of PDUs that is greater than one into which the buffered audio is to be divided at the audio client based on the buffering duration and the PDU interval; sending, to the audio client, an indication of the quantized number; and upon sending, to the audio client over the data link, importer data requests separated in time by the buffering duration, receiving, from the audio client, client data responses each including the quantized number of the PDUs.

In some aspects, the techniques described herein relate to a system, further including an exporter of the IBOC digital radio broadcast system, wherein the importer is further configured to perform: buffering the quantized number of the PDUs received in each client data response in an importer buffer; and upon receiving, from the exporter, data requests every PDU interval, sending the PDUs from the importer buffer to the exporter, one for each of the data requests.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:
at an importer of an in-band on-channel (IBOC) digital radio broadcasting system:
establishing a data link to an audio client configured to buffer audio from an audio source over a buffering duration, to produce buffered audio;
receiving, from the audio client, an indication of the buffering duration;
identifying a logical channel of an IBOC waveform that is assigned to the audio client and that is configured to transmit protocol data units (PDUs) of the audio at a PDU rate;
computing a quantized number of PDUs that is greater than one into which the buffered audio is to be divided at the audio client based on the buffering duration and the PDU rate;
sending, to the audio client, an indication of the quantized number; and
upon sending importer data requests to the audio client over the data link, receiving, from the audio client, client data responses each including the quantized number of the PDUs.

2. The method of claim 1, wherein:
sending the importer data requests to the audio client over the data link includes sending the importer data requests at a rate that is less than the PDU rate of the logical channel.

3. The method of claim 1, further comprising, at the importer:
buffering the quantized number of the PDUs received in each client data response in an importer buffer; and
upon receiving exporter data requests from an exporter of the IBOC digital radio broadcasting system, sending the PDUs from the importer buffer to the exporter.

4. The method of claim 3, further comprising:
monitoring an occupancy of the PDUs in the importer buffer that increases when buffering the quantized number of PDUs from each client data response and decreases when sending the PDUs as buffered to the exporter; and
when the occupancy falls below a threshold level, triggering sending the importer data requests to the audio client.

5. The method of claim 3, wherein:
receiving the exporter data requests includes receiving the exporter data requests at the PDU rate of the logical channel; and
sending the PDUs from the importer buffer includes sending one of the PDUs from the importer buffer for each exporter data request.

6. The method of claim 5, wherein the PDU rate of the logical channel is a block-pair-rate or a frame-rate that is a multiple of the block-pair-rate.

7. The method of claim 6, wherein the PDU rate of the logical channel is the block-pair-rate and the buffering duration corresponds to multiple block-pair-rate PDUs.

8. The method of claim 1, further comprising, at the audio client:
upon receiving, from the importer, the indication of the quantized number of the PDUs, buffering the quantized number of PDUs and waiting to receive the importer data requests; and
upon receiving each importer data request, sending the quantized number of the PDUs to the importer, such that a PDU interval corresponding to the PDU rate of the logical channel is less than an interval between successive ones of the importer data requests.

9. The method of claim 1, wherein:
establishing includes establishing the data link to include a Transmission Control Protocol (TCP)/Internet Protocol (IP) (TCP/IP) connection.

10. The method of claim 1, wherein:
the buffering duration configured on the audio client exceeds a PDU interval corresponding to the PDU rate of the logical channel, such that an interval between successive ones of the importer data requests is greater than the PDU interval, in order to compensate for transmission drops on the data link between the audio client and the importer.

11. The method of claim 1, wherein the audio includes encoded audio.

12. A system comprising:
an importer of an in-band on-channel (IBOC) digital radio broadcast system, the importer configured to perform:
establishing a data link to an audio client configured to buffer audio from an audio source over a buffering duration, to produce buffered audio;
receiving, from the audio client, an indication of the buffering duration;
identifying a logical channel of an IBOC waveform that is assigned to the audio client and configured to transmit protocol data units (PDUs) of the audio at a PDU rate;
computing a quantized number of PDUs that is greater than one into which the buffered audio is to be divided at the audio client based on the buffering duration and the PDU rate;
sending, to the audio client, an indication of the quantized number; and
upon sending importer data requests to the audio client over the data link, receiving, from the audio client, client data responses each including the quantized number of the PDUs.

13. The system of claim 12, wherein the importer is configured to perform:
sending the importer data requests to the audio client over the data link by sending the importer data requests at a rate that is less than the PDU rate of the logical channel.

14. The system of claim 12, further comprising an exporter of the IBOC digital radio broadcast system, wherein the importer is further configured to perform:
buffering the quantized number of the PDUs received in each client data response in an importer buffer; and
upon receiving exporter data requests from the exporter, sending the PDUs from the importer buffer to the exporter.

15. The system of claim 14, wherein the importer is further configured to perform:
monitoring an occupancy of the PDUs in the importer buffer that increases when buffering the quantized number of PDUs from each client data response and decreases when sending the PDUs as buffered to the exporter; and when the occupancy falls below a threshold level, triggering sending the importer data requests to the audio client.

16. The system of claim 14, wherein:

receiving the exporter data requests includes receiving the exporter data requests at the PDU rate of the logical channel; and sending the PDUs from the importer buffer includes sending one of the PDUs from the importer buffer for each exporter data request.

17. The system of claim 12, wherein the audio client is configured to perform:

upon receiving, from the importer, the indication of the quantized number of the PDUs, buffering the quantized number of PDUs and waiting to receive the importer data requests; and upon receiving each importer data request, sending the quantized number of the PDUs to the importer, such that a PDU interval corresponding to the PDU rate of the logical channel is less than an interval between successive ones of the importer data requests.

18. The system of claim 12, wherein:

the buffering duration exceeds a PDU interval corresponding to the PDU rate of the logical channel, such that an interval between successive ones of the importer data requests is greater than the PDU interval, in order to compensate for transmission drops on the data link between the audio client and the importer.

19. A system comprising:

an importer of an in-band on-channel (IBOC) digital radio broadcast system, the importer configured to perform:

establishing a data link to an audio client configured to buffer audio from an audio source over a buffering duration, to produce buffered audio;

receiving, from the audio client, an indication of the buffering duration;

identifying a logical channel of an IBOC waveform that is assigned to the audio client and configured to transmit protocol data units (PDUs) of the audio at a PDU rate corresponding to a PDU interval that is less than the buffering duration;

computing a quantized number of PDUs that is greater than one into which the buffered audio is to be divided at the audio client based on the buffering duration and the PDU interval;

sending, to the audio client, an indication of the quantized number; and upon sending, to the audio client over the data link, importer data requests separated in time by the buffering duration, receiving, from the audio client, client data responses each including the quantized number of the PDUs.

20. The system of claim 19, further comprising an exporter of the IBOC digital radio broadcast system, wherein the importer is further configured to perform:

buffering the quantized number of the PDUs received in each client data response in an importer buffer; and upon receiving, from the exporter, data requests every PDU interval, sending the PDUs from the importer buffer to the exporter, one for each of the data requests.

* * * * *